UNITED STATES PATENT OFFICE.

A. B. ELY, OF BOSTON, MASSACHUSETTS.

IMPROVEMENT IN INSULATING TELEGRAPH-WIRES.

Specification forming part of Letters Patent No. 51,935, dated January 9, 1866.

*To all whom it may concern:*

Be it known that I, A. B. ELY, of Boston, in the county of Suffolk and State of Massachusetts, have invented a new and useful Method of Insulating Telegraph-Wires and their Supports; and I do hereby declare that the following is a full, clear, and accurate description of my invention.

The materials usually employed in insulating telegraph-wires or the pins on which they are suspended are either too fragile for durability or undergo such changes by exposure and time as to be unreliable, and they are, besides, often quite expensive.

Now, it is the object of my invention to remedy these defects in insulating materials for telegraph-wires or supports for the wires of telegraph-lines; and my invention consists, first, in coating the wires for telegraphic purposes, or their supports, with paraffine or paraffine and rubber or its equivalent; and, second, in manufacturing telegraph-conductors by covering them with any suitable fiber and saturating the covering thoroughly with the composition.

In order to carry out the objects of my invention, I immerse the wire or other article to be insulated in paraffine, or paraffine and rubber, or gutta-percha mixed in proportions of not less than one of paraffine to four of rubber or gutta-percha heated to a state of fluidity, and draw the wire therefrom onto a suitable reel with only such rapidity as will permit a coating of the composition to cool upon the wire, and when it is desired to have the coating thick the immersion may be repeated until the composition adheres to the wire in successive coats; or the wire may be immersed in the material in any suitable manner for such peroid as may be found desirable. Again, I cover the wire by any of the most approved methods with a cotton, linen, or other fibrous covering, and saturate the wire so coated or the coating with paraffine, or paraffine and rubber in proper parts, melted together so thoroughly as to completely incorporate the composition with the fibrous covering, and leave, if desirable, a covering of the composition on the outside.

When I desire to insulate or to improve the insulating capacity of the brackets, cross-arms, or any other supports for telegraph-wires, I apply my composition of paraffine or paraffine and rubber warm in successive layers, like varnish, or I dip them into the preparation, as may be most convenient, until the desired thickness of my insulating material, or a sufficient saturation thereof is attained, and when thus prepared either the wire for telegraphing purposes or the supports for such wires will be effectually insulated by a durable material and with marked economy.

What I claim as my invention, and desire to secure by Letters Patent, is—

1. Insulating telegraph-wires or their supports with the material applied in the manner substantially as and for the purposes set forth.

2. The new article of manufacture herein described, constituting an insulated wire, made substantially as described, for the purposes set forth.

In testimony whereof I have hereunto subscribed my name.

A. B. ELY.

Witnesses:
A. P. ROLLINS,
W. M. PARKER.